United States Patent [19]

Shiflett

[11] Patent Number: 5,234,613
[45] Date of Patent: Aug. 10, 1993

[54] SUBSTANTIALLY CONSTANT BOILING COMPOSITIONS OF DIFLUOROMETHANE AND PROPANE

[75] Inventor: Mark B. Shiflett, Newark, Del.

[73] Assignee: E.I. Du Pont de Nemours and Company, Wilmington, Del.

[21] Appl. No.: 767,846

[22] Filed: Sep. 30, 1991

[51] Int. Cl.$^5$ .............. C09K 5/04/3/30; A62D 1/08; C08J 9/14

[52] U.S. Cl. ........................... 252/67; 62/114; 252/2; 252/8; 252/162; 252/172; 252/305; 252/364; 252/571; 252/DIG. 9; 264/53; 264/DIG. 5; 521/98; 521/131

[58] Field of Search ............... 252/67, 162, 172, 305, 252/364, DIG. 9, 2, 8, 571; 62/114; 264/53, DIG. 5; 521/98, 131

[56] References Cited

U.S. PATENT DOCUMENTS

| | | | |
|---|---|---|---|
| 2,511,993 | 6/1950 | Reed | 252/67 |
| 3,173,872 | 3/1965 | Broadley | 252/67 |
| 4,174,295 | 11/1979 | Bargigia | 252/305 |
| 4,354,955 | 10/1982 | Wittenhorst | 252/305 |
| 4,482,465 | 11/1984 | Gray | 252/67 |
| 4,561,201 | 12/1985 | Sanborn | 40/213 |
| 5,059,633 | 10/1991 | Lutter | 252/182.25 |
| 5,080,823 | 1/1992 | Arnaud | 252/67 |
| 5,108,637 | 4/1992 | Pearson | 252/67 |

FOREIGN PATENT DOCUMENTS

| | | | |
|---|---|---|---|
| 62-20221 | 5/1987 | Japan. | |
| 966107 | 10/1982 | U.S.S.R. | 252/67 |
| 2228739 | 9/1990 | United Kingdom | 252/67 |
| 92/16597 | 10/1992 | World Int. Prop. O. | |

OTHER PUBLICATIONS

*Chemical Engineers' Handbook* 5th Edition, Edited by Perry & Chilton pp. 3-183 and 3-196, copyright 1973.
*Chemical Abstract* No. 59:14552h abstract of Findeis, *Mitt. Vereinigte Metallwerke Ranshoffen-Berndorf* vol. 9 p. 21-4 1961.
*Research Disclosure* vol. 146 pp. 13-14, Disclosure No. 14623 "Hydrogen containing chlorofluorocarbons" Disclosed by E.I. Du Pont de Nemours Co. Jun. 1976.
*Chemical Abstract* No. 113:100250b abstract of Latini et al *Int. J. Refrig* vol. 13 No. 4 pp. 248-255 1990.

*Primary Examiner*—Linda Skaling

[57] ABSTRACT

Substantially constant boiling compositions that are mixtures of difluoromethane and propane that are useful as refrigerants, aerosol propellants, heat transfer media, gaseous dielectrics, fire extinguishing agents, and expansion agents for polymers.

4 Claims, No Drawings

SUBSTANTIALLY CONSTANT BOILING COMPOSITIONS OF DIFLUOROMETHANE AND PROPANE

BACKGROUND OF THE INVENTION

This invention relates to mixtures of a fluorinated hydrocarbon and an aliphatic hydrocarbon and, more specifically, to substantially constant boiling compositions of difluoromethane with propane.

Concern over the ozone depletion potential of certain halocarbons has resulted in a search for alternative compounds having lower ozone depletion potentials. Recently the long-term environmental effects of chlorofluorocarbons have come under substantial scientific scrutiny because it has been postulated that these materials decompose in the stratosphere, under the influence of ultraviolet radiation, to release chlorine atoms. Chlorine atoms are theorized to undergo chemical reaction in the stratosphere, which could deplete the stratospheric ozone layer, and substantial reduction of stratospheric ozone could have a serious deleterious impact on the quality of life on earth.

There is a limit to the number of fluorinated hydrocarbon substances which can be candidates as environmentally safe materials. Mixtures of known materials, however, might be used if the desired combination of properties could be found in a given mixture. Simple mixtures, however, create problems in design and operation of refrigeration and other equipment because of component segregation in both the vapor and liquid phases. To avoid excessive component segregation problems, it is particularly desirable to discover new substantially constant boiling blends of compounds that do not suffer from component segregation problems. Unfortunately, it is not possible to predict the formulation of azeotropes or azeotrope-like compositions, thus complicating the search for compositions which possess the desired combination of properties.

There is an urgent need for substantially constant boiling compositions that behave similarly to a single compound resulting in insignificant amounts of separation of the mixture upon boiling.

SUMMARY OF THE INVENTION

The present invention is directed to substantially constant boiling compositions which comprise (a) difluoromethane and (b) propane, wherein said composition contains about 67–90 weight percent, preferably about 67–75 weight percent difluoromethane (HFC-32), based on the sum of the weights of (a) and (b) and the balance, about 10–33 weight percent, preferably 25–33 weight percent, propane (HC-290). Especially preferred azeotropic compositions comprise about 70 weight percent difluoromethane and 30 weight percent propane wherein the weight percent is based on the sum of the weights of difluoromethane and propane.

The compositions of the present invention exhibit a higher vapor pressure than either of its two components. Substantially constant boiling compositions as used in the present invention mean that the initial vapor pressure at 25° C. does not change by more than 10% after half of the initial mixture has been allowed to evaporate. Thus, the compositions described herein resist component segregation which would seriously diminish their usefulness in the contemplated applications. These substantially constant boiling fluorocarbon-containing compositions are especially useful as power cycle working fluids, e.g., refrigerants and heat transfer media, aerosol propellants, gaseous dielectrics, fire extinguishing agents, and expansion agents for polymers, for example, for polyolefins and polyurethanes.

DETAILED DESCRIPTION OF PREFERRED EMBODIMENTS

The fluorinated hydrocarbon component used in the composition of this invention is difluoromethane, identified in the halocarbon industry as HFC-32. The second component used in the composition is the saturated aliphatic hydrocarbon propane.

A phase study of various mixtures of difluoromethane and propane wherein the composition was varied containing widely different amounts of the difluoromethane and propane indicates that at constant temperature an azeotrope is formed over the temperature range studied. Further studies for the evaluation of substantially constant boiling compositions of the present invention containing a wide range of proportions of the difluoromethane and propane resulted in resistance to component fractionation of the mixture so that the compositions retain a substantially constant boiling point at constant temperature. Utilizing difluoromethane and propane components in the amounts disclosed, quite unexpectedly, illustrates that at a constant temperature of 25° C. the change in vapor pressure of the composition even after 50% of the initial composition has been allowed to evaporate does not change more than 10%. The small change in vapor pressure at constant temperature illustrates that the amount of separation and loss of one component in excess amount that would substantially change the boiling point of the mixture does not occur which makes the compositions especially suitable for the contemplated uses, e.g., refrigerants, aerosol propellants, foaming agents, etc.

In addition, studies have indicated that the novel substantially constant boiling compositions of the present invention exhibit dew and bubble point pressures with small pressure differentials. As is well known in the art, the difference between dew point and bubble point pressures at the same temperature is an indication of the constant boiling or azeotrope-like behavior of mixtures. The pressure differentials demonstrated by the substantially constant boiling compositions of the present invention are very small, when compared with those of several known nonazeotropic compositions.

The compositions of the present invention are further characterized in that at constant temperature the difference between the pressure corresponding to the bubble point and the pressure corresponding to the dew point of the mixture is not greater than about 10 psia.

As is well recognized in this field of technology, there is a range of compositions which contain the same components as the true azeotrope, which not only will exhibit substantially equivalent properties as the true azeotrope for refrigeration and other applications, but which will also exhibit substantially equivalent properties as the true azeotrope in terms of constant boiling characteristics and tendency not to segregate or fractionate on boiling at other temperatures and pressures.

Other fluorohydrocarbons can be added to the constant boiling mixture of HFC-32 and propane without changing substantially the azeotrope-like properties of the compositions. Representative fluorohydrocarbons that can be added to the constant boiling mixtures of the present invention include chlorodifluoromethane (HCFC-22), pentafluoroethane (HFC-125), perfluoropropane (FC-218), 1,1,2,2-tetrafluoroethane (HFC-134), 1-chloro-1,1,2,2-tetrafluoroethane (HCFC-124a), 1-chloro-1,2,2,2-tetrafluoroethane (HCFC-124), 1,1,1,2,3,3,3-heptafluoropropane (HFC-227ea), 1,1,1,2,2,3,3-heptafluoropropane (HFC-227ca), 1,1,1-trifluoroethane (HFC-143a), trifluoroethane (HFC-23), 1,1-difluoroethane (HFC-152a) and fluoroethane (HFC-161).

Additives that are frequently incorporated in the fluorocarbon compositions of the present invention include lubricants, corrosion inhibitors, stabilizers and dyes.

In addition to refrigeration applications, the novel constant boiling compositions of the present invention are useful as aerosol propellants, heat transfer media, gaseous dielectrics, fire extinguishing agents, expansion agents for polymers, for example, for polyolefins and polyurethanes and as power cycle working fluids.

The compositions described herein can be used to provide refrigeration by condensing the constant boiling compositions and thereafter evaporating the compositions, e.g., condensate, in the vicinity of a body to be cooled. Further, these compositions can also be used to provide heat, for example, in a heat pump, by evaporating the composition and thereafter condensing the constant boiling compositions in the vicinity of a body to be heated.

The use of substantially constant boiling compositions of this invention eliminates the problem of component fractionation in system operations, because these compositions behave substantially as a single substance.

The compositions of this invention have zero ozone depletion potentials compared with Refrigerant 502, which has a 0.25 ozone depletion potential.

EXAMPLE 1

A phase study was made on mixtures of difluoromethane and propane wherein the composition was varied and the vapor pressures measured at a constant temperature of −15.3° C. An azeotropic composition was obtained, as evidenced by the maximum vapor pressure observed, and was identified as follows:

Difluoromethane = about 70 weight percent
Propane = about 30 weight percent
Vapor pressure = about 4832 torr at −15.3° C.

A phase study at other temperatures indicates the azeotrope changes as follows:

(a) Difluoromethane = about 72 weight percent
Propane = about 28 weight percent
Vapor pressure = about 15997 torr at 25° C.

(b) Difluoromethane = about 74 weight percent
Propane = about 26 weight percent
Vapor pressure = about 28954 at 50° C.

(c) Difluoromethane = about 68 weight percent
Propane = about 32 weight percent
Vapor pressure = about 1216 torr at −50° C.

EXAMPLE 2

A phase study on the constant boiling compositions of difluoromethane and propane verifies minimal fractionation and change in vapor pressure and composition during a vapor loss at 25° C. Initial liquid (IQ), final liquid (FQ), initial vapor (0), final vapor (1), vapor pressure, and change in vapor pressure from initial vapor pressure show the effects of vapor leakage on both the composition and the vapor pressure, as illustrated below in Table 1.

TABLE 1

| Sample | Loss of Mixture | Composition (wt %) HFC-32 | Composition (wt %) Propane | Vapor Pressure (psia) | Vapor Pressure Change (psia %) |
|---|---|---|---|---|---|
| IQ | 0 | 70.0 | 30.0 | 310.0 | 0 |
| 0 | 0 | 72.2 | 27.8 | 310.0 | 0 |
| 1 | 50 | 71.9 | 28.1 | 309.9 | 0.03 |
| FQ | 50 | 67.9 | 32.1 | 309.9 | 0.03 |
| IQ | 0 | 80.0 | 20.0 | 309.3 | 0 |
| 0 | 0 | 74.3 | 25.7 | 309.3 | 0 |
| 1 | 50 | 76.0 | 24.0 | 307.0 | 0.7 |
| FQ | 50 | 85.1 | 14.9 | 307.0 | 0.7 |
| IQ | 0 | 90.0 | 10.0 | 301.5 | 0 |
| 0 | 0 | 78.7 | 21.3 | 301.5 | 0 |
| 1 | 50 | 89.3 | 10.7 | 273.9 | 9.2 |
| FQ | 50 | 97.4 | 2.6 | 273.9 | 9.2 |

The data in the above Table indicates that the mixtures of difluoromethane and propane (which represent the extremes of the composition of the present invention) are substantially constant boiling with only a maximum change in vapor pressure of 9.2% with 50% of the initial mixture evaporated. A mixture can be considered substantially constant boiling if it has less than a 10% change in vapor pressure after 50% leakage of the mixture at a constant temperature of 25° C.

EXAMPLE 3

Evaluation of the refrigeration properties of the substantially constant boiling compositions of the invention versus the single compounds, HCFC-22, Refrigerant-502, and pentafluoroethane (HFC-125), are shown in Table 2.

TABLE 2

| Comparison of Refrigeration Performance | | | | | |
|---|---|---|---|---|---|
| Component | HCFC-22 | R-502 | HFC-125 | 32/Propane (wt %) 80/20 | 32/Propane (wt %) 70/30 |
| Evaporator Temp., °F. | −30 | −30 | −30 | −30 | −30 |
| Evaporator Pressure (psia) | 19.6 | 24.0 | 26.7 | 34.7 | 45.8 |
| Condenser Tem., °F. | 115 | 115 | 115 | 115 | 115 |
| Condenser Pressure (psia) | 258 | 282 | 327 | 420 | 389 |
| Compressor Discharge Temp., °F. | 303 | 239 | 223 | 337 | 273 |
| Coefficient of Performance | 1.97 | 1.89 | 1.69 | 1.83 | 2.06 |
| Refrigeration Capacity (Btu/min) | 76.6 | 80.0 | 79.4 | 124 | 151 |

Coefficient of Performance (C.O.P.) is the ratio of net refrigeration effect to the compressor work. It is a measure of refrigeration energy efficiency.

Capacity means the change in enthalpy of the refrigerant in the evaporator, i.e., the heat removed by the refrigerant in the evaporator per time. Refrigeration capacity is based on a fixed compressor displacement.

For a refrigeration cycle typified by the conditions shown in Table 2 for the evaporator and the condenser, the C.O.P.s shown in the Example are higher than the C.O.P. of pentafluoroethane (HFC-125) alone. Also, the azeotrope of HFC-32 and propane has a higher C.O.P. than both R-502 and HCFC-22. The azeotropic mixture of HFC-32 and propane has a higher capacity than either HCFC-22, R-502 or HFC-125.

For a refrigeration cycle typified by the conditions shown in Table 2 for the evaporator and condenser, the capacity is one of the most crucial variables to consider.

EXAMPLE 4

The pressure differential of substantially constant boiling compositions of the present invention in the amount shown below are determined by the difference between the pressure of the dew point at 25° C. and the pressure of the bubble point at 25° C. of each formulation. For the purposes of comparison the pressure differentials for mixtures outside the range of components required are given.

TABLE 3

| Dew Point and Bubble Point Pressures at 25° C. | | | |
|---|---|---|---|
| Refrigerant Composition (weight %) | Dew Point (psia) | Bubble Point (psia) | Difference (psia) |
| HFC-32 + Propane (60 + 40) | 269.9 | 307.7 | 38.6 |
| HFC-32 + Propane (65 + 35) | 290.5 | 309.5 | 19.0 |
| HFC-32 + Propane (70 + 30) | 307.2 | 310.0 | 2.8 |
| HFC-32 + Propane (72 + 28) | 307.4 | 309.2 | 1.8 |
| HFC-32 + Propane (80 + 20) | 307.8 | 309.3 | 1.5 |
| HFC-32 + Propane (85 + 15) | 309.3 | 307.0 | 2.3 |
| HFC-32 + Propane (90 + 10) | 310.0 | 301.5 | 8.5 |
| HFC-32 + Propane (95 + 5) | 306.6 | 287.6 | 19.0 |
| HFC-32 + Propane (99 + 1) | 277.5 | 259.2 | 18.3 |

The results show that there is only a small difference between the dew point and bubble point pressures at 25° C. which indicates that the compositions do not undergo significant fractionation and behave as a single compound having a substantially constant boiling point.

I claim:

1. A substantially constant boiling composition consisting essentially of (a) difluoromethane and (b) propane, wherein said composition consists essentially of about 67–75 weight percent difluoromethane, and about 25–33 weight percent propane, and wherein when the temperature is adjusted to 25° C. the vapor pressure of the composition is about 309 psia.

2. A composition of claim 1 consisting essentially of about 70 weight percent difluoromethane and about 30 weight percent propane having a boiling point of about −15.3° C. at 4832 torr.

3. A process for cooling which comprises condensing the composition of claim 1 and thereafter evaporating said composition in the vicinity of a body to be cooled.

4. A process for cooling which comprises condensing the composition of claim 2 and thereafter evaporating said composition in the vicinity of a body to be cooled.

* * * * *